MULTIWAY TELEGRAPH REPEATER SYSTEM

Filed Jan. 26, 1950 2 Sheets-Sheet 1

INVENTOR
F. H. HANLEY
BY H. A. Pattison
ATTORNEY

INVENTOR
F. H. HANLEY
BY H. A. Pattison
ATTORNEY

Patented Dec. 29, 1953

2,664,466

UNITED STATES PATENT OFFICE 2,664,466

MULTIWAY TELEGRAPH REPEATER SYSTEM

Frank Harold Hanley, Butler City, N. J., assignor to American Telephone and Telegraph Company, a corporation of New York Application January 26, 1950, Serial No. 140,707

13 Claims. (Cl. 178—73)

This invention relates to telegraph systems and particularly to multiway telegraph repeaters arranged for hub operation. The hub circuit operation enables additional repeater circuits to be established, or the existing circuit to be rearranged, without loop-poling changes, adjustment of loop currents, whereby it becomes unnecessary to compensate for added or removed loop or line circuits.

An object of the invention is to simplify the operation of repeaters arranged for hub circuit operation by arranging all repeaters of the system for full duplex operation regardless of whether single, one-way or full duplex service is to be furnished, and reducing, in general, the amount of equipment required for satisfactory repeater transmission.

Heretofore multiway telegraph repeaters arranged for hub operation required a relatively high current for operating the send relay of each of the repeaters of a repeater system, whereby the number of repeaters in a telegraph concentration group was limited.

According to the present invention a considerably large number of loop and line circuits may be arranged for interconnection at a repeater station. Each of the loop or line circuits has a receive and a send leg, or conductor. Each receive conductor terminates in the operating winding of a receive relay and each send conductor terminates at the armature of a send relay. The receive relay is normally held in its marking position by the current normally flowing in its operating winding, the biasing current in the other winding, when used, or a mechanical bias on the armature, or the like being effective to operate the relay to its spacing position when its loop or line circuit is opened. The send relay is normally held in its marking position by current flowing in a marking direction through its two windings connected in series aiding, and is arranged to operate to its spacing position in response to a current flowing in a spacing direction through its two windings, in series aiding. Interconnecting the hub sides of the receive and send conductors of each repeater are means operable in response to the signals incoming over the receive leg of a loop or line circuit, to hold the associated send relay in a marking position for the duration of the message incoming over the receive conductor and thereafter until a message is received over the receive conductor of another loop or line circuit. In one arrangement the interconnecting means responsive to signals incoming over the receive conductor is an electromagnetic relay arranged to operate in response to the start impulse of the first code combination of the incoming message and to remain operated for the duration of the message and thereafter until the signals are received over the receive conductor of another loop or line circuit of the repeater system. In an alternative arrangement the electromagnetic relay serving as the interconnecting means is replaced by an impedance network comprising resistors, an inductance and an electronic tube which, under similar circumstances, maintains the send relay associated with the loop or line circuit over which signals are being received at the time in a marking position for the duration and thereafter until signals are received over the receive conductor of another loop or line circuit.

A feature of the present invention resides in the provision of means interconnecting the drop or hub side of the receive and send legs of each repeater in the repeater system for preventing the operation of the send relay during the time when its associated receive relay is receiving signals incoming over its loop or line circuit.

Another feature is the provision of an impedance network comprising resistors, an inductance and an electronic tube interconnecting the drop or hub side of the receive and send legs of each repeater in a repeater system for preventing the operation of the send relay during the time when its associated receive relay is receiving signals incoming over its loop or line circuit.

Another feature pertains to the use of the three relays whereof one serves as a control relay interconnecting the hub side of the receive and send conductors of each repeater in a multiway regenerative repeater system for preventing the operation of the send relay during the time when its associated receive relay is receiving signals incoming over its loop or line circuit, and immediately thereafter until the regenerative repeater returns to its normal marking position.

Another feature is the elimination of the apex battery tap from the windings of the send relay of a repeater whereby a current of 5 milliamperes in the two windings, in series aiding, of the send relay of each repeater provides as much margin in operation as a current of 20 milliamperes in one winding with a biasing current of 10 milliamperes in the other to permit the operation of four times as many legs in parallel with a given current flow. For example, a current of 100 milliamperes flowing through the contacts of the hub relay would permit five legs at 20 milliamperes of current to be operated in parallel and would permit twenty legs at 5 milliamperes of current in each to be operated in parallel.

Another feature is the provision of an electronic tube in the receive conductor of each of the loop and line repeaters for preventing the shunting of the repeater common to all the loop and line repeaters of the multiway repeater system.

Another feature resides in the provision of an arrangement wherein a large number of loop and line circuits may be interconnected directly through a simple repeater or through a one-way regenerative repeater without causing signal distortion or reducing the speed of operation.

Another feature resides in the standardization of the appearance of all loop and line circuits of greatly different characteristics at a repeater station so as to facilitate their interconnections to add other loop and line circuits or to replace or remove existing loop or line circuits without adjustment or compensation of resistance values.

Other objects and features will appear in the following detailed description and appended claims when considered with reference to the accompanying drawings in which:

Fig. 1 shows a schematic circuit arrangement of a multiway telegraph repeater system comprising a plurality of loop and line repeaters interconnected for hub operation, each having three polarized electromagnetic relays, namely, a receive relay, a send relay and a control relay cooperating with common repeating means. The control relay in its operated position prevents its send relay from repeating the message over the loop or line circuit from which the message was originally received; Fig. 1–A shows the wiring required for Fig. 1 when the repeater relay repeats the signals incoming over one loop or line circuit directly to the send relays of the remaining loop and line circuits; Fig. 1–B shows schematically a regenerative repeater and wiring therefor, used with the system shown in Fig. 1. The use of the control relay makes preferable the use of the regenerative repeater; and Fig. 2 shows an alternative system for that shown in Fig. 1 wherein the control relay circuit for each repeater is eliminated. The number of hub conductors is reduced from three to two and the use of an electronic tube in the receive leg of each repeater permits any number of such legs to be connected together to form a circuit without having any shunting effect on the operating winding of the hub relay, and because of the elimination of this shunting effect, the alternative system does not necessitate repetition by means of a regenerative repeater although the use of such repeater may be desirable.

The electronic tube may be also used in the system shown in Fig. 1 to produce the same results.

Although the loop and line circuits are for different uses with respect to their application to the systems, the terms "loop," "line," "loop circuit" and "line circuit" will, for patent purposes, be used herein interchangeably.

*General description of Fig. 1*

The system shown in Fig. 1 provides in each repeater an electromagnetic relay interconnecting a receive hub conductor and a send hub conductor. The relay comprises means for controlling or holding the send relay of the loop or line circuit over which incoming signals are received in an operated position for the duration of the incoming message and thereafter until a message begins to come in over another loop or line circuit. This system employs three hub conductors, namely, a receive hub, a send hub and a control hub, each of which is common to the loop and line circuit repeaters employed in the system. The control electromagnetic relay is of the polarized type and operates in response to the first or start impulse of a message incoming over the receive leg of a loop or line circuit. This control relay remains locked operated until the direction of message transmission over such loop or line circuit is reversed. A regenerative repeater for furnishing regenerated signals for transmission to the loop and line circuits other than the one from which the incoming message is received, may be desirable when a control relay is used in each of the loop and line repeaters, because, as hereinbefore stated, the third hub conductor necessitated by the use of a control relay has a shunting effect on the winding of the hub repeater relay.

During the idle periods the receive relays of the repeaters are in their marking or right-hand positions and no current flows through the operating or upper windings of any of the control relays. Each control relay comprises, in addition to its operating winding, a hold winding. When no current is flowing in the operating winding of a control relay, current is flowing in the hold winding thereof in a direction to hold the relay armature locked in the position to which it was last operated. This current flowing through the hold winding when the relay is in its marking position is a net quantity resulting from currents simultaneously flowing from two oppositely poled sources through the winding as will be hereinafter described. When incoming signals are received over any of the loop or line circuits they are repeated not only over the receive conductor of such loop or line repeater to a common repeater but also over the common control hub circuit which extends through the operating windings, in parallel, of all the control relays. In response to the first or start impulse of a message, a current flows in a spacing direction, that is, from left to right through the operating winding of the control relay associated with the loop or line circuit over which the incoming message is being received, and in a marking direction, that is, from right to left through the operating winding of each of the control relays associated with the other or idle loop and line circuits. Accordingly, the control relay associated with the loop or line circuit over which the message is received operates to its spacing or left-hand position as shown at relay 1–C–2 whereby the send relay associated with the same loop or line circuit is held locked operated in its marking or right-hand position as shown at relay 1–S–2 for the duration of the message incoming over such loop or line circuit and thereafter until the direction of message transmission over such loop or line circuit is reversed. When the send relay is held in its marking position by its associated control relay being held in its left-hand position, the signals in the output circuit of the common repeater are prevented from being transmitted over the send leg of the loop or line circuit over which the incoming message is received and therefore no message can be repeated back to the station or distant point at which it originated. The control relays respectively associated with the idle loop or line circuits are at this time operated to or maintained in their marking or right-hand positions as shown at relays 1-C-1 and 1-C-10, and therefore the send relays respectively associated with these idle line and loop circuits are free to respond to the output of the common repeater whereby the message is repeated by each of such send relays over the send legs of the idle loop and line circuits.

It will be observed in the system shown in Fig. 1, that relays 1-R-1, 1-S-1 and 1-C-1 are associated with loop circuit 101-A; relays 1-R-2, 1-S-2 and 1-C-2 are associated with loop circuit 101-B and relays 1-R-10, 1-S-10 and 1-C-10 are associated with line circuit 101-J. The 1-R relays are the receive relays responsive to signals incoming over their respective receive legs of the loop or line circuits. The 1-S relays are the send relays and are provided to send signals from the send hub circuit conductor 1-SH to the send legs of their respective loop or line circuits over which no signals are incoming at the time when the receive leg of another loop or line circuit is receiving signals. The 1-C relays are the control relays which, upon receiving the first start impulse of a message incoming over their respective loop and line circuits, control the operation of their respective send relays.

The receive relay receives the signal impulses over its receive leg and repeats them in parallel paths extending (1) over receive hub conductor 1-RH and through the operating or upper winding of hub relay 1-H, and (2) through the upper winding of its control relay and then through the upper windings, in parallel, of the control relays respectively associated with the other loop or line circuits.

The improved multiway repeater may use hub relay 1-H only, which is of the simple repeater type, for repeating the signals incoming over one loop or line circuit to each of the other loop or line circuits and in such case the output circuit of relay 1-H extends in a manner as shown in Fig. 1-A. In multiway repeater systems wherein regenerated signals are required, the output circuit of relay 1-H may extend as shown in Fig. 1-B. In Fig. 1-B, relay 2-H represents a one-way regenerative repeater which may be of the type shown and described in Patent 2,105,173 granted to W. J. Zenner on January 11, 1938, which patent is hereby made a part of this specification as if fully set forth herein.

In the regenerative repeater the signals are restored to their proper length, as originally transmitted, by an electromechanical timing mechanism well known in the art. The changing of the signals back to their original length, as transmitted from the distant end of a loop or line circuit, involves storing the received signal elements in the regenerating mechanism for a short interval equal to about half the length of each element, while the nature of each character forming element is definitely determined. Then each element is retransmitted by what may be generally characterized as a motor driven electromechanical interrupter which transmits signal elements of proper length. The retimed signals are then transmitted simultaneously to send relays respectively connected to the loop and line circuits other than the loop or the line circuit over which the signals were received and these send relays simultaneously repeat the retimed signals to their respectively associated loops and line circuits.

*Detailed description of Fig. 1*

Figure 1:
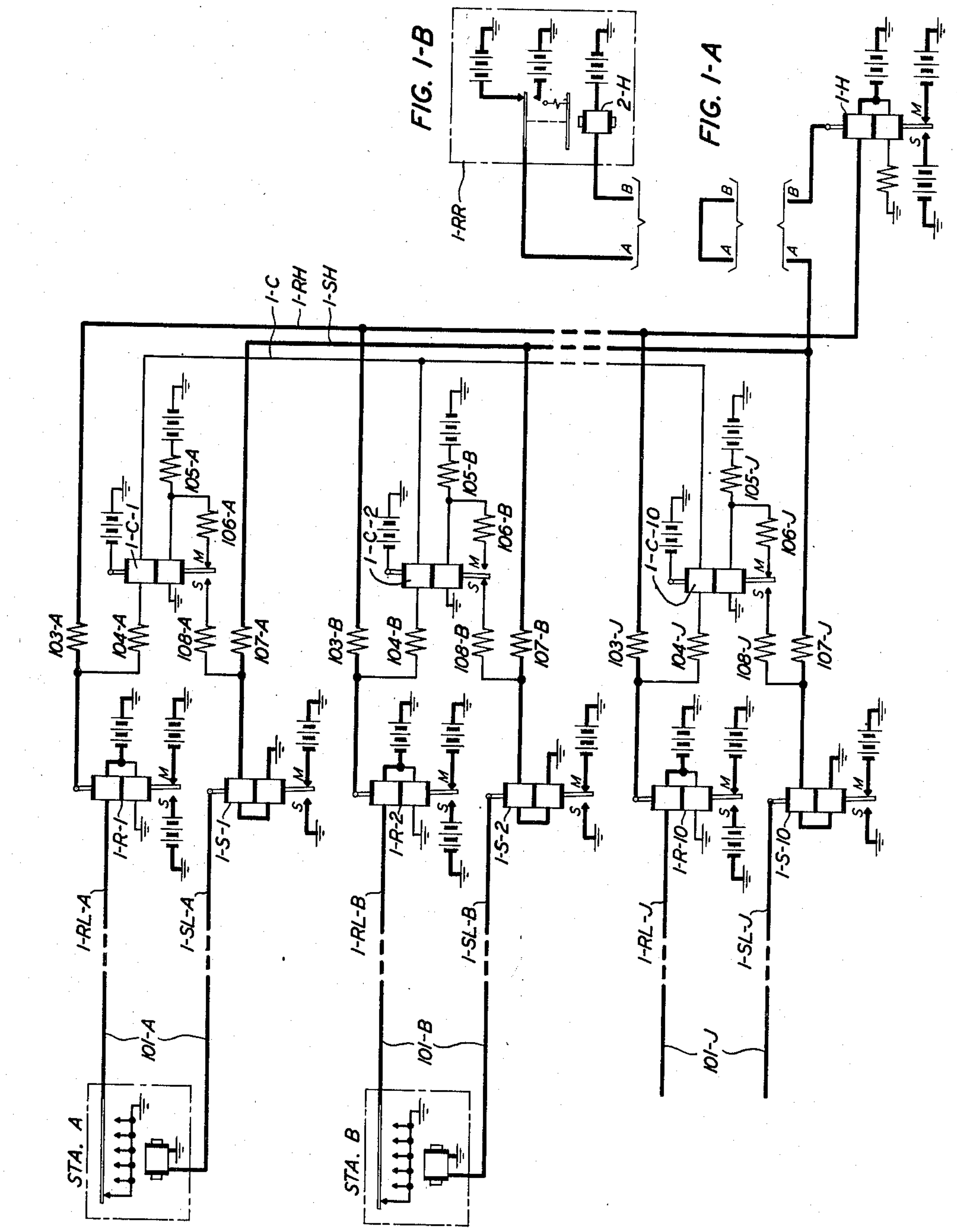

In the arrangement shown in Fig. 1, the effect of current flowing through the windings of the three relays of a line repeater will first be explained. Relays 1-R-2, 1-S-2 and 1-C-2 of the repeater of loop circuit 101-B will be used to illustrate this operation and will suffice for the repeaters of the other loop and line circuits such as circuits 101-A and 101-J. Circuits 101-A, 101-B and 101-J are representative of ten or more loop and line circuits.

If it should be assumed that station B was not the last station of the system to transmit a message to the multiway repeater, the repeater and control circuits of line circuit 101-B would, during the idle periods, extend from grounded negative 130-volt battery connected to the marking or right-hand contact M and armature of receive relay 1-R-2 to two parallel paths, the repeater circuit including resistor 103-B having a resistance value, say of 13,000 ohms, receive hub conductor 1-RH, the upper winding of relay 1-H to grounded negative 130-volt battery, and the control circuit including resistor 104-B having a resistance value, say of 3,000 ohms, upper winding of relay 1-C-2, control conductor 1-C, to which the upper windings of the other control relays, such as 1-C-1 and 1-C-10 are connected, the upper windings of these other control relays being connected to paths respectively extending through resistors, such as resistors 104-A and 104-J, to grounded negative 130-volt batteries connected at the marking contacts M and armatures of receive relays 1-R-1 and 1-R-10, respectively. Each of the other resistors, such as resistors 104-A and 104-J, also has a resistance value say of 3,000 ohms. It will be noted that the receive hub conductor 1-RH is also connected to loop circuit 101-A in a path including resistor 103-A, the armature and marking contact M of receive relay 1-R-1 and grounded negative 130-volt battery, and for line circuit 101-J, to a path including resistor 103-J, the armature and marking contact M of receive relay 1-R-10 and grounded negative 130-volt battery. Each of the resistors, such as resistors 103-A and 103-J, has a resistance value of 13,000 ohms like that of resistor 103-B.

As hereinbefore stated, during the idle periods of the multiway repeater when no current is flowing in the operating or upper winding of a control relay, current is flowing in the hold or lower winding thereof in a direction to hold the relay armature locked in the position to which it was last operated. In the control relays associated with the loop or line circuits which are receiving signals from the common repeater, the current in the hold winding of each of these relays is in a marking direction. Relays 1-C-1 and 1-C-10 are shown with their respective armatures in engagement with their marking contacts "M," a position in which they are locked during the time when they are receiving signals from the common repeater and thereafter until a message is received over their respective line or loop circuit. It will be noted that the armature of relay 1-C-2 is shown in its spacing position. The armature of a control relay associated with a line or loop circuit over which incoming signals were last received remains in its spacing position until signals are received from another loop or line circuit.

It will now be assumed that station B associated with control relay 1-C-2 has finished sending and another station, such as station A, starts to send. Accordingly, control relay 1-C-1 which is associated with the line circuit about to send is, as hereinbefore stated, in its marking position due to marking current flowing through its hold winding. This marking current is 5 milliamperes and is the result of currents simultaneously flowing from two oppositely poled sources of 130 volts. These opposing currents will now be described in connection with control relay 1-C-1. The current from the positive source flows through resistor 105-A having a resistance value, say of 25,000 ohms, the hold winding to ground, the value of this current being 5 milliamperes in a spacing direction. The current from the negative source flows in a circuit extending over the armature and right-hand contact of relay 1-C-1, resistor 106-A having a resistance value, say of 13,000 ohms, through the hold winding of relay 1-C-1 to ground, the value of this current being 10 milliamperes in a marking direction. The difference between these two opposing currents in the hold winding of relay 1-C-1 is therefore 5 milliamperes in a marking direction, which at this time, holds the armature of relay 1-C-1 in its marking or right-hand position.

When the first or start impulse is received from station A over a receive leg, say conductor 1-RL-A of loop circuit 101-A, receive relay 1-R-1 operates to its spacing or left-hand position to thereby connect a source of grounded positive 130 volts to the control circuit to cause a current of a value, say of approximately 80 milliamperes for ten loop and line repeaters, to flow in a spacing direction through the operating or upper winding of control relay 1-C-1 and to flow in the opposite direction, that is, marking, through the upper windings of the control relays of the other loop and line circuits, dividing according to the number of control relays. The spacing current, say of 80 milliamperes, opposes and predominates over the net current of 5 milliamperes marking now flowing in the hold winding of relay 1-C-1 and the armature of relay 1-C-1 therefore operates to its spacing or left-hand position. The current in the operating winding of each of the other control relays connected in parallel is approximately 8 milliamperes, assuming ten such relays, and flows in a marking direction which is the same direction as that of the current normally flowing in the hold windings of all other control relays except control relay 1-C-2 which is assumed to be at this time still in its spacing or left-hand position because it is associated with station B which was the last to send a message to the multiway repeater. Therefore the currents simultaneously flowing in the two windings of each of the other relays of the idle loop and line circuits aid in holding their respective armatures in their right-hand positions. The effective current flowing in both windings of control relay 1-C-2 in response to the first or start impulse of the message has a net value of approximately 3 milliamperes marking which is sufficient to now operate the relay armature to its marking position.

When the armature of control relay 1-C-1 moves away from its right-hand contact in response to the spacing current flowing through the operating winding of the relay, the circuit of the hold winding wherein the marking current of 10 milliamperes normally flows is opened and only the spacing current of 5 milliamperes remains in the hold winding. This spacing current of 5 milliamperes aids the spacing current flowing in the operating winding of relay 1-C-1 in operating relay armature to its left-hand contact.

Therefore, when a message is incoming from station A over receive leg 1-RL-A of loop circuit 101-A, receive relay 1-R-1 follows the signals. Control relay 1-C-1 operates its armature to its left-hand position in response to the first or start impulse of the message repeated by receive relay 1-R-1 and remains in that position until a message starts to come in over a receive leg of another loop or line circuit. The hub relay 1-H is arranged for inverse neutral reception whereby it is operated from its normal position only in response to space current impulses repeated by receive relay 1-R-1 and impressed on the upper winding of relay 1-H. The current in the upper winding of relay 1-H predominates over the current normally flowing in its biasing or lower winding. Relay 1-H follows the signals repeated by the relay 1-R-1 and repeats them (1) to the send relays of the idle loop circuits such as loop circuit 101-B and the idle circuits such as line circuit 101-J when wiring as shown in Fig. 1-A is used or (2) to regenerative repeater 1-RR wherein the signal impulses are restored to a condition in which they were when they were originally transmitted, and then retransmitted to the send relays associated with the idle loop and line circuits.

The send relay 1-S-1 associated with loop circuit 101-A over which the incoming message is received holds its armature at this time in its marking or right-hand position by the marking current of 5 milliamperes flowing in a circuit including in the series connection a source of grounded negative 130-volt armature and left-hand contact of relay 1-C-1, resistor 108-A having a resistance value, say of 5,000 ohms, and the upper and lower windings of relay 1-S-1 to ground. Send relay 1-S-1 is therefore prevented from responding to the signal impulses retransmitted from the regenerative repeater 1-RR or repeated by hub relay 1-H during the time when the armature of control relay 1-C-1 is held operated to its spacing or left-hand position. Send relays of the idle loop and line circuit, such as relay 1-S-2 of loop circuit 101-B and relay 1-S-10 of line circuit 101-J, are however responsive to the signal impulses retransmitted from regenerative repeater 1-RR or repeated by hub relay 1-H.

By means of the arrangement shown in Fig. 1, signals incoming over a receive leg of a loop or line circuit are prevented from being retransmitted over the send leg of the same loop or line circuit but all other loop and line circuits of the system are capable of responding to the message so regenerated or repeated and retransmitting it to their respective stations or terminating points.

When a message incoming over a loop or line circuit is completed, the loop or line circuit remains closed and the receive relay of that loop or line circuit remains in its marking position and grounded sources of negative 130 volts are again continuously connected to the control circuit hub through the upper winding of the associated control relay which in this case is assumed to be relay 1-C-1. Consequently, the current flowing in the upper winding in response to each incoming spacing impulse ceases and the unopposed current, say of 5 milliamperes, which continues to flow in a spacing direction in the hold winding, holds the armature of relay 1-C-1 in its left-hand position until the first or start impulse of a message is received over the receive leg of another loop circuit or line circuit at which time the current will again flow in the operating or upper winding of relay 1-C-1 but in the opposite direction whereby relay 1-C-1 operates its armature back to its right-hand position in which it is locked for such other message.

Figure 2:
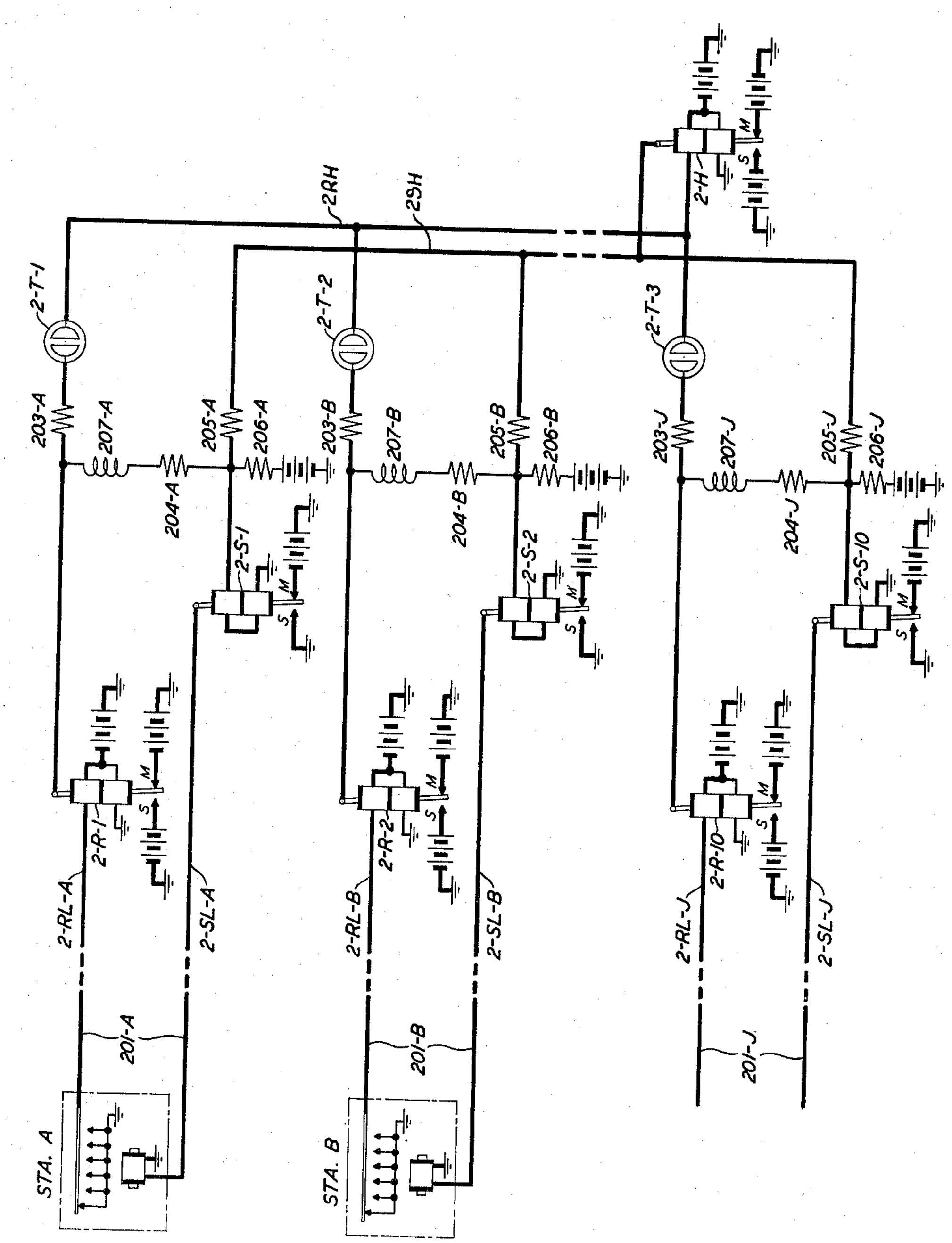

*Description of the system shown in Fig. 2*

The system shown in Fig. 2 differs from that shown in Fig. 1 in that each loop or line circuit has instead of a control electromagnetic relay a control network comprising an inductance coil, resistors and an electronic tube preferably of the ordinary two-element neon type. It comprises for each line or loop repeater (1) a receive relay which upon responding to signals incoming over its loop or line circuit repeats the incoming signals as polar impulses on an inverse neutral transmission basis over an output circuit whereof a conductor extends in series connection through a resistor having a resistance value, say of 9,500 ohms, a gaseous type of electric discharge device designed to ionize at about 70 volts, the operating winding of a hub electromagnetic relay to a source of grounded negative potential, say of 130 volts; (2) a send relay for retransmitting over the send leg of its loop or line circuit signals repeated by the hub relay from a source of potential, say of 130 volts, the signals being repeated over a circuit path extending through a resistor having a resistance value, say of 26,000 ohms, the windings in series aiding of the send relay to ground; and (3) the above-mentioned control network whereof its inductance coil is connected to the receive relay output conductor and its resistor is connected to the send relay input conductor at points respectively adjacent to the armature of the receive relay and the operating or upper winding on the hub side of the send relay. The control network resistor has a resistance value, say of 13,000 ohms. Also each loop and line repeater includes a second resistor having a resistance value of the order of 13,000 ohms connected to a source of grounded positive potential, the latter resistor being connected to the send relay input conductor at the same point as the control network resistor of the same resistance value of 13,000 ohms. The control network controls its send relay whereby the send relay of the repeater associated with the loop or line circuit over which the message signals are incoming is held in its marking or right-hand position for the duration of the incoming message and thereafter until a message is received from another of the loop or line circuits. Only two hub conductors common to all the loop and line repeaters of the system are required.

The use of the tube in the receiving relay output circuit of a loop or line repeater permits any number of such output circuits to be connected together to form a repeater system without having any shunting effect on the operating winding of the hub relay as exists in the system shown in Fig. 1 wherein the current flowing in the control conductor of any one of the loop or line repeaters also flows in the control conductors of all the other loop and line repeaters of the system in shunt to the operating or upper winding of the hub relay therein.

It will be noted in the system shown in Fig. 2 that associated individually with each of the subscriber loop circuits 201-A, 201-B, etc. and each of the line circuits, such as line circuit 201-J, are two relays only, such as relays 2-R-1 and 2-S-1, which are associated with the loop circuit 201-A and relays 2-R-10 and 2-S-10 associated with line circuit 201-J. The 2-R relays are the receive relays responsive to signals incoming over their respective receive legs of the loop and line circuits, for example, relay 2-R-1 is responsive to signals incoming over receive leg 2-RL-A of loop circuit 201-A. The 2-S relays are the send relays and are provided to send signals from the send hub circuit conductor 2-SH to the send legs of these loop and line circuits which are idle at the time when message signals are incoming over one of the loop or line circuits, for example, should message signals be incoming over the receive leg 2-RL-A of loop circuit 201-A then these would be repeated by hub relay 2-H to the send relays of the other loop and line circuits, such as relays 2-S-2 and 2-S-10, which would repeat the signals for transmission over their respective send legs 2-SL-B and 2-SL-J of the loop circuit 201-B and line circuit 201-J.

In the output circuit conductor of the receive relay of each loop and line repeater are a resistor and a gaseous type of electric discharge device, such as resistor 203-A and tube 2-T-1, respectively, for the repeater of loop circuit 201-A. In the input circuit conductor of the send relay of each loop and line repeater is a resistor such as resistor 205-A in the repeater for loop circuit 201-A. The receive relay output circuit conductors of all the loop and line repeaters of the system are connected in parallel to a receive hub 2-RH which forms a part of the input circuit of hub relay 2-H. The send relay input circuit conductors of all the loop and line repeaters are connected in parallel to a send hub 2-SH which forms a part of the output circuit of hub relay 2-H. Interconnecting the output circuit conductor of the receive relay and the input circuit conductor of the send relay of each of the loop and line circuit repeaters is the control network which comprises the inductance coil and the resistor connected in series in a manner as represented by the arrangement of coil 207-A and resistor 204-A in the repeater for loop circuit 201-A. The coil 207-A is connected to the output conductor of receive relay 2-R-1 at a point adjacent to the relay armature, and the resistor 204-A is connected to the input conductor of send relay 2-S-1 at a point adjacent to the hub side of the upper winding of the send relay. Also connected to the send relay input circuit conductor at a point adjacent to the hub side of the operating winding of the send relay of each loop and line repeater is a resistor connected to a source of grounded positive potential, say of 130 volts, the resistor being such as that designated 206-A for the repeater on loop circuit 201-A.

The receive relay of each repeater is arranged to receive the signal impulses incoming over its receive leg and repeat them through its associated electric discharge tube to the operating or upper winding of the hub relay 2-H. Hub relay 2-H operates in a manner substantially similar to that of the hub relay 1-H in Fig. 1. Hub relay 2-H has a biasing or lower winding connected to a source of grounded negative potential, say of 130 volts, whereby a marking current, say of approximately 10 milliamperes, normally holds the relay in its marking or right-hand position. In each of the loop and line repeaters the value of the resistance of the resistor such as resistor 203-A of the repeater of loop circuit 201-A is, say 9,500 ohms, which is sufficient to produce a spacing current of approximately 20 milliamperes in the operating or upper winding of hub relay 2–H at a time when a spacing signal impulse is received from the loop or line circuit. Under this condition since the potential difference across the tubes in the receive relay output circuit conductors of those repeaters which are in receiving position at the time is considerably less than 70 volts which is the potential required to ionize the tube, no current will flow in the receive leg of the idle repeaters and consequently the operating winding of hub relay 2–H will not be shunted. With this arrangement, no shunting effect will occur regardless of the number of repeaters employed in the multiway repeater system.

The send relay of the repeater associated with the loop or line repeater over which message signals are being received is held operated to its marking or right-hand position for the duration of the message and thereafter until the direction of transmission over such loop or line circuit is reversed by means of the resistor interconnecting the output circuit conductor of its receive relay and the input circuit conductor of the associated send relay.

*Detailed description of system in Fig. 2*

The operation of the multiway repeater system shown in Fig. 2 will now be described in detail. When the system is in normal condition, the armatures of receive relays 2–R are on their respective marking contacts. Under this condition, the control network of each repeater receives a 10-milliampere spacing current from a source of negative potential, say of 130 volts, connected to the marking contact of its receive relay. In the case of receive relay 2–R–1, this spacing current flows through resistor 204–A having a resistance value of 13,000 ohms, and the windings in series aiding of send relay 2–S–1. Also in the case of receive relay 2–R–1, a 10-milliampere marking current flows at the same time from a source of positive potential, say of 130 volts, through resistor 206–A having a resistance value of 13,000 ohms, through the windings in series aiding of send relay 2–S–1 to ground. These 10-milliampere currents flowing in opposite directions through the windings of send relay 2–S–1 neutralize each other and therefore have no effect on send relay 2–S–1. However, there is a marking current of 5 milliamperes simultaneously flowing from a source of positive potential, say of 130 volts, on the marking contact of hub relay 2–H, through resistor 205–A of a resistance value of say 26,000 ohms, the windings in series aiding of send relay 2–S–1 to ground and this 5-milliampere current holds send relay 2–S–1 on its marking contact.

It will now be assumed that signals are incoming over loop 201–A and that in response to the start impulse of the first incoming signal which impulse is always spacing, the armature of receive relay 2–R–1 moves to its spacing contact. While the armature is traveling between contacts, that is, from its marking to its spacing contact, the normal current flow in the winding of send relay 2–S–1 is increased from 5 milliamperes in the marking direction to 12.3 milliamperes in the marking direction by the difference in the marking current flow of 15 milliamperes and a spacing current flow of 2.7 milliamperes. The 15-milliampere current flows from two parallel paths one being traceable from the source of positive potential of 130 volts at the marking contact and armature of hub relay 2–H, send hub conductor 2–SH, resistor 205–A of 26,000 ohms resistance, through the winding in series aiding of send relay 2–S–1 to ground and the other being traceable from the source of positive potential of 130 volts through resistor 206–A of 13,000 ohms resistance and the windings in series aiding of send relay 2–1–S to ground. The 2.7 milliamperes current in a spacing direction is produced in a circuit traceable from a source of negative potential of 130 volts connected to the winding of hub relay 2–H, through the relay winding, receive hub conductor 2–RH, tube 2–T–1, resistor 203–A of a resistance value of say 9,500 ohms, inductance coil 207–A, resistor 204–A of 13,000 ohms resistance, the windings, in series aiding, of send relay 2–S–1, to ground. The resistance of tube 2–T–1 for this interval of the travel time of the armature of relay 2–R–1 is equal to 26,000 ohms, the total effective resistance for the circuit producing the 2.7 milliamperes current being 26,000 ohms, plus 9,500 ohms, plus 13,000 ohms which equals 48,500 ohms.

$$\text{Resistance of tube 2-T-1}=R=\frac{E}{I}=\frac{E}{\frac{E}{R}}=\frac{\text{70 volts for tube ionization}}{\frac{+130\text{ volts}-70\text{ volts}}{13000\text{ ohms}+9500\text{ ohms}}}=26000\text{ ohms}$$

$$I=\frac{130\text{ volts}}{48500}=2.7\text{ milliamperes spacing current}$$

When receive relay 2–R–1 reaches its spacing contact and before hub relay 2–H leaves its marking contact, a marking current of approximately 25 milliamperes flows through the windings, in series aiding, of send relay 2–S–1. In this case where two parallel resistors 204–A and 206–A are equal in their resistance value, say 13,000 ohms each, $$\left(R_x=\frac{R1\times R2}{R4+R2}=\frac{R}{2}=\frac{13000\text{ ohms}}{2}\right)$$

the current thus flowing through the windings, in series aiding, of send relay 2–S–1 when the armature of relay 2–R–1 reaches its spacing contact before the armature of hub relay 2–H leaves its marking contact is $$I=\frac{+130\text{ volts at M contact on relay 2H}}{\frac{\frac{13000\text{ ohms}}{2}\times 26000\text{ ohms}}{\frac{13000\text{ ohms}}{2}+26000\text{ ohms}}}=+25\text{ milliampheres, marking current}$$

When the armature of hub relay 2–H is positioned in engagement with its spacing contact, the marking current in the winding of send relay 2–S–1 is reduced to fifteen milliamperes, that is, the difference between twenty milliamperes marking current and five milliamperes spacing current.

$$I=\frac{+130\text{ volts}}{\frac{R1\times R2}{R1+R2}}=\frac{+130\text{ volts}}{\frac{13000\text{ ohms}\times 13000\text{ ohms}}{13000\text{ ohms}+13000\text{ ohms}}}=\frac{130\text{ volts}}{6500\text{ ohms}}=+20\text{ milliamperes, marking current}$$

$$I=\frac{-130\text{ volts}}{26000\text{ ohms}}=-5\text{ milliamperes, spacing current}$$

When a marking signal is again received the armature of relay 2–R–1 is positioned to its marking contact. During the time when the armature of relay 2–R–1 is moving from its spacing to its marking contact and before the armature of relay 2–H leaves its spacing contact, a marking current of 2.2 milliamperes (neglecting the inductance of coil 207–A connected in series with resistor 204–A) flows through the windings, in series aiding, of send relay 2–S–1. This current is the difference between 10 milliamperes and 7.8 milliamperes or 2.2 milliamperes.

$$I=\frac{+130\text{ volts}}{13000\text{ ohms}}=+10\text{ milliamperes, marking current}$$

$$I=\frac{-130\text{ volts}}{\frac{R1\times R2}{R1+R2}}=$$

$$\frac{-130\text{ volts}}{\frac{26000\text{ ohms}\times(13000\text{ ohms}+9500\text{ ohms}+26000\text{ ohms})}{26000\text{ ohms}+48000\text{ ohms}}}=7.8\text{ milliamperes, spacing current}$$

Should the armature of relay 2–R–1 reach its marking contact before the armature of relay 2–H leaves its spacing contact, a spacing current of approximately −5 milliamperes (spacing) would flow momentarily through the windings, in series aiding, of relay 2–S–1.

$$I=\frac{-130\text{ volts}}{26000\text{ ohms}}=-5\text{ milliamperes, spacing current.}$$

In order to prevent the tendency of "kick-off" by the send relay armature in the case where the send relay is of high sensitivity, an inductance such as inductance 207–A, and a tube such as tube 2–T–1, are used in series with their associated resistor such as resistor 204–A. However, should the inductance and the tube be omitted in each of the repeater circuits, the tendency of the send relay to "kick-off" its contact when the associated receive relay is receiving is noticeable only by a click sound in a telephone headset when one is used for testing purposes, but this tendency is insufficient to cause distortion to be recorded in the transmission measuring set in any part of the loop or line repeater circuit.

Elimination of the tendency for the "kick-off" effect by the inductance and the tube is due to the hub relay 2–H causing its armature to operate more rapidly from its space to its mark position with the inductance and tube, than without them and because the build-up of the current caused by the closure of the armature of the receive relay to its marking contact is delayed in the windings of the send relay until after the armature of relay 2–H returns to its marking contact. This is because when the armature of a receive relay such as relay 2–R–1 leaves the spacing contact the inductance coil 207–A generates a negative potential equal to the negative potential of a source of 130 volts connected between the winding of hub relay 2–H and ground, causing tube 2–T–1 to be deionized and the spacing current in the operating or upper winding of hub relay 2–H to collapse quickly.

*Transmission from hub relay to send relay of repeaters in sending condition*

When a repeater is in a sending condition, that is, with its receiving relay armature in engagement with its marking contact, the current flow from the source of negative potential, say of 130 volts, through a resistor such as resistor 204–B of 13,000 ohms, is neutralized by the current flow from the source of positive potential of 130 volts, through the resistor 206–B so that the combined effect of these currents on the winding, in series aiding, of send relay 2–S–2 is zero, and consequently an effective current of approximately five milliamperes from the source of either negative or positive potential of 130 volts on the armature of hub relay 2–H, through resistor 205–B of 26,000 ohms, through the windings, in series aiding, of send relay 2–S–2 to ground, cause relay 2–S–2 as well as the send relays of the other idle repeaters to follow the signals repeated by hub relay 2–H.

The use of an electronic tube in the receive conductor of each of the loop and line repeaters is not restricted to gas tubes, but may be served by vacuum tubes as well.

The quantities used herein are for illustrative purposes only and may be varied, as desired, to produce results that are within the scope of the invention.

What is claimed is:

1. A telegraph system comprising a plurality of lines, a line repeater having a receive and a send relay for each of said lines, an output circuit for each of said receive relays, a common repeater connected to the receive and the send relay of each of said line repeaters, means controlled by the first or start impulse of a message incoming over any one of said lines and repeated by the receive relay thereof for permitting the message repeated by said common repeater to be retransmitted by the respective send relays of the line repeaters of the other said lines only, and other means connected in each of said output circuits for preventing the shunting of said common repeater during the reception of a message by the receive relay of any one of said line repeaters.

2. A telegraph system, according to claim 1, wherein said other means includes an electronic device for regulating the amount of current flowing through each of said output circuits to said common repeater.

3. A telegraph system, according to claim 1, wherein said other means includes a gaseous electronic tube for regulating the amount of current flowing through each of said output circuits to said common repeater.

4. A telegraph system comprising a plurality of lines, a line repeater having a receive relay, a send relay and one control relay only for each of said lines, a common repeater connected to the receive and the send relays of said line repeaters, and circuit means controlled by said control relay of any one of said line repeaters in response to the first or start impulse of a message incoming over the line associated with said one repeater for maintaining operated the send relay of said one line repeater for the duration of the incoming message repeated by said common repeater and thereafter until another message is received over another one of said line repeaters.

5. A telegraph system comprising a plurality of lines, a repeater having a receive and a send relay connected to each of said lines, a common repeater, a receive conductor connecting each of said receive relays with said common repeater, a send conductor connecting said common repeater with each of said send relays, and circuit means interconnecting the receive and send conductors of each of said line repeaters, impedance means included in each of said circuit means effective in response to the first or start impulse of a message received over its line and repeated by the receive relay of its line repeater to said common repeater to thereby hold the send relay of its associated line repeater non-responsive to the signals of the message repeated by said common repeater and thereafter until another message is received over another of said lines.

6. A telegraph system comprising a plurality of lines, a repeater having a receive and a send relay connected to each of said lines, a single one-way repeater for repeating message signals received from the receive relay of any one of said line repeaters to the send relays of all the other of said line repeaters, circuit means interconnecting the receive and the send relay of each line repeater, impedance means included in said circuit means effective in response to the first or start impulse of a message received from the receive relay of any one of said line repeaters for preventing the send relay of said one line repeater from transmitting the message repeated by said single one-way repeater to the line over which it was received.

7. A telegraph system comprising a plurality of lines, a repeater having a receive and a send relay connected to each of said lines, a common repeater, a receive conductor connecting each of said receive relays with said common repeater, a send conductor connecting said common repeater with each of said send relays, an impedance network interconnecting the receive and send conductors of each of said line repeaters, and a second impedance network and a grounded potential source cooperating therewith for holding in locked operated condition in response to the first or start impulse of a message repeated from any one of said lines, the send relay of said one line to thereby prevent the message repeated by said common repeater from being transmitted back over said one line.

8. A start-stop telegraph system comprising a plurality of lines, a repeater in each line having a receive and a send conductor, a circuit interconnecting said conductors of each repeater, operable means in each receive conductor responsive to start-stop signals incoming over its line, a source of polar signals, a pair of contacts in engageable relation with each of said operable means for impressing space and mark current impulses from said source on the receive conductor of its associated line repeater for repetition over the send conductors of the other repeaters only, a source of potential connected to each of said interconnecting circuits, means in one of said circuits controlled by its associated one of said operable means and effective in response to a space current impulse from said source of polar signals for causing said one circuit to be energized from its source of potential in such a manner as to make the send conductor of said associated line repeater ineffective for the duration of the message and thereafter until an incoming signal is received over another of said lines, and other means in the other of said circuits controlled by the other of said operable means for maintaining their respectively associated interconnecting circuits deenergized in such a manner as to make the send conductors of said other repeaters effective to repeat the signals for outgoing transmission over their respective lines.

9. A start-stop telegraph system comprising a plurality of lines, a repeater having a receive and a send relay connected to each of said lines, a common repeater, a receive conductor connecting each of said receive relays to said common repeater, a send conductor connecting said common repeater to each of said send relays, in parallel, a control relay inter-connecting the receive and send conductors of each of said line repeaters, each control relay having means responsive to the first or start impulse of a message received over its line and repeated by the receive relay of its line repeater to said common repeater, to hold the send relay of said line repeater non-responsive to the signals of the message and thereafter until another message is received over another of said lines.

10. A start-stop telegraph system comprising a plurality of lines, operable means for each line responsive to start-stop signals incoming over its line, a relay for each line, said relay having an operating winding, a hold winding, an armature and contacts in engageable relation with said armature, a source of polar signals, a pair of contacts in engageable relation with each of said operable means for impressing space and mark current impulses from said source on the operating winding of said relay, a source of potential connected to the hold winding of each of said relays, circuit means controlled by each of said operable means and effective in response to a space current impulse from said source of polar signals for operating the armature of the relay associated with the line over which the incoming start-stop signal is received, to its associate alternate contact and for maintaining the armature of the relays associated with the other of said lines at their respective normal contacts, other circuit means including the hold winding of each of said relays for holding its relay armature in continuous engagement with its respective alternate or normal contact for the duration of a message and thereafter until a signal is received over another of said lines.

11. A telegraph signal comprising a plurality of lines, a repeater for each of said lines, a common repeater, a receive conductor connecting each of said line repeaters to said common repeater, a send conductor connecting said common repeater to each of said line repeaters, a control relay for interconnecting said receive and said send conductor of any one of said line repeaters, operable means and a pair of contacts therefor on said control relay, a hold winding on said one control relay for holding said operable means in engagement with either of the contacts of said pair, means controlled by said operable means when held in engagement with one of said contacts for maintaining said one line repeater non-responsive to signals repeated by said common repeater in response to signals incoming over said one line repeater, and other means controlled by said operable means when held in engagement with the other of said contacts for maintaining said one line repeater responsive to signals repeated by said common repeater in response to signals incoming over another of said line repeaters.

12. A telegraph system comprising a plurality of lines, a repeater for each of said lines, a receive, a send and a control relay in each of said line repeaters, a common repeater for retransmitting incoming signals received from the receive relay of any one of said line repeaters to the send relays of all the other of said line repeaters, said control relay having an operating winding for receiving signals from the receive relay of any one of said line repeaters, and an armature and a pair of contacts therefor, a hold winding on each of said control relays for retaining said armature in engagement with either contact of said pair depending on which one of said receive relays is receiving signals from its line, means including said armature in engagement with one contact of said pair for preventing the send relay associated with the receive relay receiving signals from its line from responding to the signals transmitted by said common repeater, and other means including said armature in engagement with the other contact of said pair for preparing the send relays respectively associated with the receive relays of the idle lines to respond to the signals transmitted from the common repeater.

13. A telegraph system comprising a plurality of lines, a line repeater having a receive relay and a send relay for each of said lines, a common repeater connected to the receive and send relays of said line repeaters, circuit means interconnecting the receive relay and the send relay of each of said line repeaters, and means included in each of said circuit means and responsive to the first, or start, impulse of an incoming message signal repeatered by the receive relay of the respectively associated line repeater for preventing the send relay of said respectively associated line repeater from responding to impulses repeatered by said common repeater.

FRANK HAROLD HANLEY.

References Cited in the file of this patent

UNITED STATES PATENTS

| Number | Name | Date |
|---|---|---|
| 2,069,223 | Cummings | Feb. 2, 1937 |
| 2,154,624 | Kinkead | Apr. 18, 1939 |
| 2,334,551 | Hanley | Nov. 16, 1943 |
| 2,539,550 | Rea | Jan. 30, 1951 |
| 2,539,551 | Rea | Jan. 30, 1951 |